(12) United States Patent
Chang (10) Patent No.: US 11,622,652 B2
(45) Date of Patent: Apr. 11, 2023

(54) OIL DISCHARGE ROAST PAN AND COOKING DEVICE HAVING SAME

(71) Applicant: Tsann Kuen (Zhangzhou) Enterprise Co., Ltd., Fujian (CN)

(72) Inventor: Wenyu Chang, Zhangzhou (CN)

(73) Assignee: Tsann Kuen (Zhangzhou) Enterprise Co., Ltd., Fujian (CN)

( * ) Notice: Subject to any disclaimer, the term of this patent is extended or adjusted under 35 U.S.C. 154(b) by 855 days.

(21) Appl. No.: 16/596,420

(22) Filed: Oct. 8, 2019

(65) Prior Publication Data

US 2020/0113381 A1 Apr. 16, 2020

(30) Foreign Application Priority Data

Oct. 12, 2018 (CN) .......................... 201811190227.1

(51) Int. Cl.
| | |
|---|---|
| *A47J 37/06* | (2006.01) |
| *A47J 27/00* | (2006.01) |
| *A47J 36/34* | (2006.01) |
| *F24C 15/14* | (2006.01) |

(52) U.S. Cl.
CPC .......... *A47J 37/067* (2013.01); *A47J 27/002* (2013.01); *A47J 36/34* (2013.01); *F24C 15/14* (2013.01)

(58) Field of Classification Search
CPC ........ A47J 27/002; A47J 36/34; A47J 37/067; A47J 37/0676; A47J 37/0709; F24C 15/14
USPC .......................................................... 99/450
See application file for complete search history.

(56) References Cited

U.S. PATENT DOCUMENTS

| | | | |
|---|---|---|---|
| 4,979,440 A | 12/1990 | Latour et al. | |
| 5,355,779 A | 10/1994 | O'Brien et al. | |
| 5,546,851 A | 8/1996 | Goto | |
| 5,719,377 A * | 2/1998 | Giebel ................ | A47J 37/0676 219/448.11 |
| 7,810,487 B2 * | 10/2010 | Johnston ............. | A47J 37/0694 126/152 A |
| 8,631,739 B2 * | 1/2014 | Reischmann ....... | A47J 37/0713 99/446 |
| 9,839,321 B2 * | 12/2017 | Lee ......................... | A47J 37/06 |
| 9,955,817 B2 * | 5/2018 | Ahmed ............... | A47J 37/0694 |

FOREIGN PATENT DOCUMENTS

| | | | | |
|---|---|---|---|---|
| DE | 19924299 A1 | | 11/2000 | |
| EP | 2745755 A1 * | | 6/2014 | ........... A47J 37/067 |

OTHER PUBLICATIONS

Stecher, Christoph, English Translation EP 2745755 A1, Jun. 25, 2014 (Year: 2014).*
Search Report issued to European counterpart application No. 19202176.4 by the EPO dated Feb. 3, 2020.
Anonymous: "Broil King Verkaufskatalog 2017", (Jan. 1, 2017) XP055661708, Retrieved from the Internet: URL: http://broilkingstore.com/wp-content/uploads/sites/2/2017/03/Broil-King-Katalog-2017.pdf.

* cited by examiner

*Primary Examiner* — Dana Ross
*Assistant Examiner* — James F Sims, III
(74) *Attorney, Agent, or Firm* — Burris Law, PLLC (57) ABSTRACT

A cooking device includes a heating unit and an oil discharge roast pan mounted to the heating unit. The oil discharge roast pan includes a pan body, a plurality of oil discharge holes extending through top and bottom surfaces of the pan body, and a plurality of protrusions protruding downwardly from the bottom surface.

15 Claims, 9 Drawing Sheets

OIL DISCHARGE ROAST PAN AND COOKING DEVICE HAVING SAME

CROSS-REFERENCE TO RELATED APPLICATION

This application claims priority to Chinese Patent Application No. 201811190227.1, filed on Oct. 12, 2018.

FIELD

The disclosure relates to a cooking device including an oil discharge roast pan

BACKGROUND

Roasted food smell is usually very enticing. Therefore, roasters have become desirable cooking utensils for home and restaurant kitchens. A roaster generally includes a base, a roast pan disposed on the base, and a heating unit mounted on the base to heat the roast pan.

Figure 1:
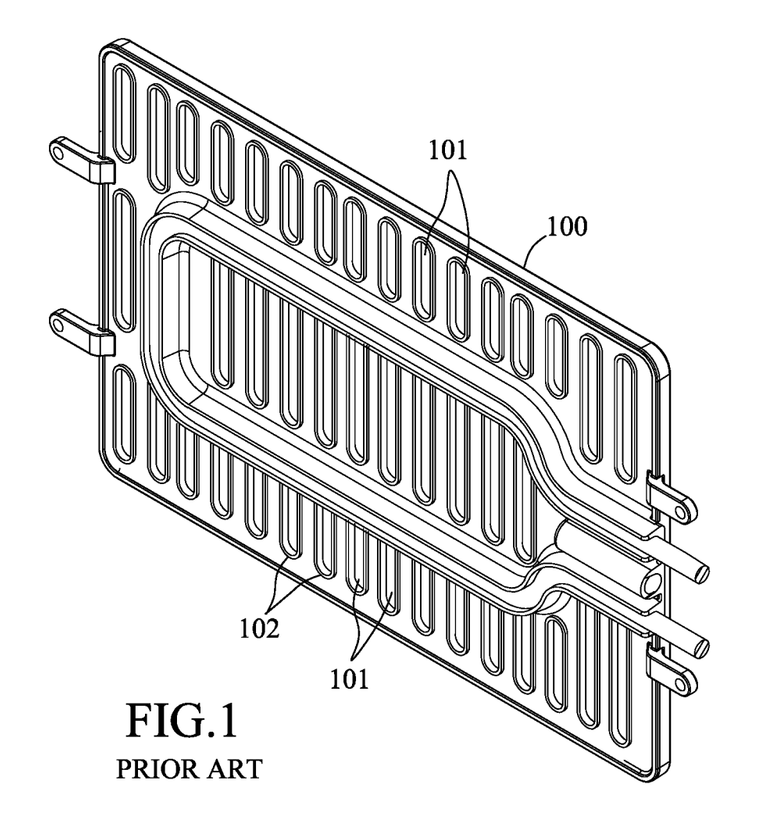
FIG. 1 is a perspective view illustrating an existing oil discharge roast pan.
Figure 2:
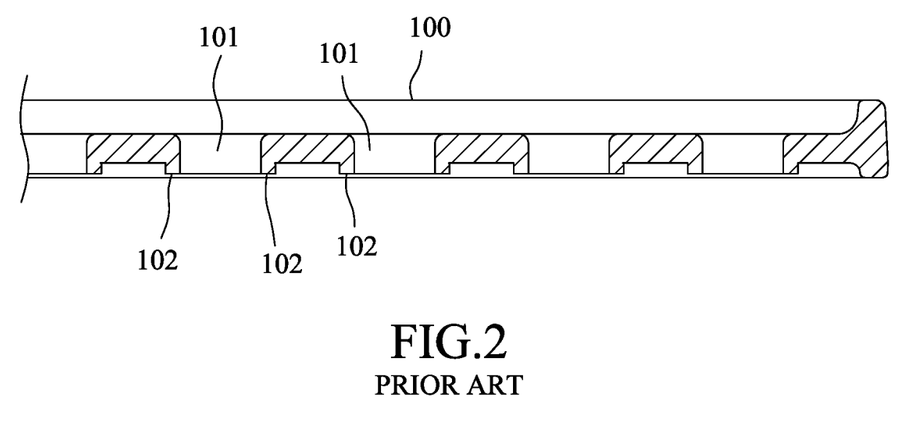
FIG. 2 is a partially cross-sectional view of the existing oil discharge roast pan.

FIGS. 1 and 2 show an existing roast pan 100 used for removal of grease drippings during cooking meat. The roast pan 100 includes a plurality of oil discharge holes 101 extending through top and bottom surfaces of the roast pan 100, and a plurality of protrusions 102 extending downwardly and adjoining the oil discharge holes 101. However, the roast pan 100 may be unable to drain the grease drippings quickly, so that the grease drippings may be overheated and generate a considerable amount of smoke. Further, the grease drippings are easily stuck in dead spaces of the protrusions 102, causing difficulties for cleaning the roast pan 100.

SUMMARY

Therefore, one object of the disclosure is to provide a cooking device that can alleviate at least one of the drawbacks of the prior art.

According to the object of the disclosure, a cooking device includes a heating unit and an oil discharge roast pan mounted on the heating unit. The oil discharge roast pan includes a pan body, a plurality of oil discharge holes extending through top and bottom surfaces of the pan body, and a plurality of protrusions protruding downwardly from the bottom surface.

In one embodiment, the pan body further comprises a plurality of food support portions which are spaced apart from each other to cooperatively define the oil discharge holes, and the protrusions are disposed under the food support portions.

In one embodiment, the protrusions and the food support portions are integrally formed with the pan body.

In one embodiment, the protrusions are arranged in multiple rows, and the protrusions in each row are linearly disposed under one of the food support portions.

In one embodiment, the oil discharge roast pan further comprises a mounting rib disposed under the bottom surface of the pan body and connected to the food support portions. The mounting rib is defined with a mounting groove that extends along a length direction of the mounting rib and that has an opening facing downwardly. The heating unit comprises a heating member that extends along the mounting groove and that is embedded in the mounting groove.

In one embodiment, each of the mounting rib and the mounting groove is U-shaped.

In one embodiment, each of the protrusions has a top side edge adjoining a boundary of one of the oil discharge holes.

In one embodiment, each of the protrusions tapers downwardly from the bottom surface.

In one embodiment, each of the protrusions has a hemispherical, conical, or pyramidal shape.

According to another object of the disclosure, an oil discharge roast pan is provided. The oil discharge roast pan comprises a pan body, a plurality of oil discharge holes extending through top and bottom surfaces of the pan body, and a plurality of protrusions protruding downwardly from the bottom surface. The protrusions each have a cross-section gradually decreasing downwardly from the bottom surface.

In one embodiment, the pan body further comprises a plurality of food support portions which are spaced apart from each other to cooperatively define the oil discharge holes, and the protrusions are disposed under the food support portions.

In one embodiment, the protrusions and the food support portions are integrally formed with the pan body.

In one embodiment, each of the protrusions has a top side edge adjoining a boundary of one of the oil discharge holes.

In one embodiment, the oil discharge roast pan further comprises a mounting rib disposed under the bottom surface of the pan body and connected to the food support portions. The mounting rib is defined with a mounting groove that extends along a length direction of the mounting rib and that has an opening facing downwardly. The mounting groove is configured for a heating unit to be embedded therein.

In one embodiment, each of the protrusions tapers downwardly from the bottom surface.

In one embodiment, each of the protrusions has a hemispherical, conical or pyramidal shape.

In one embodiment, each of the food support portions is formed between two of the oil discharge holes. Each of the protrusions has two opposite top side edges respectively adjoining the boundaries of two of the oil discharge holes.

In one embodiment, the protrusions are arranged in multiple rows, and the protrusions in each row are disposed under one of the food support portions at intervals.

By virtue of the particular structural design of the protrusions protruding downwardly from the bottom surface of the oil discharge roast pan of the disclosure, the oil discharge roast pan has an efficient grease collecting effect and can rapidly discharge grease drippings. The problem of roasting smoke encountered in the prior art can thus be considerably alleviated. In addition, since the oil discharge roast pan has a bottom surface with an open-type design that greatly reduce the amount of dead spaces, the oil discharge roast pan can be easily cleaned and preserved.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 3:
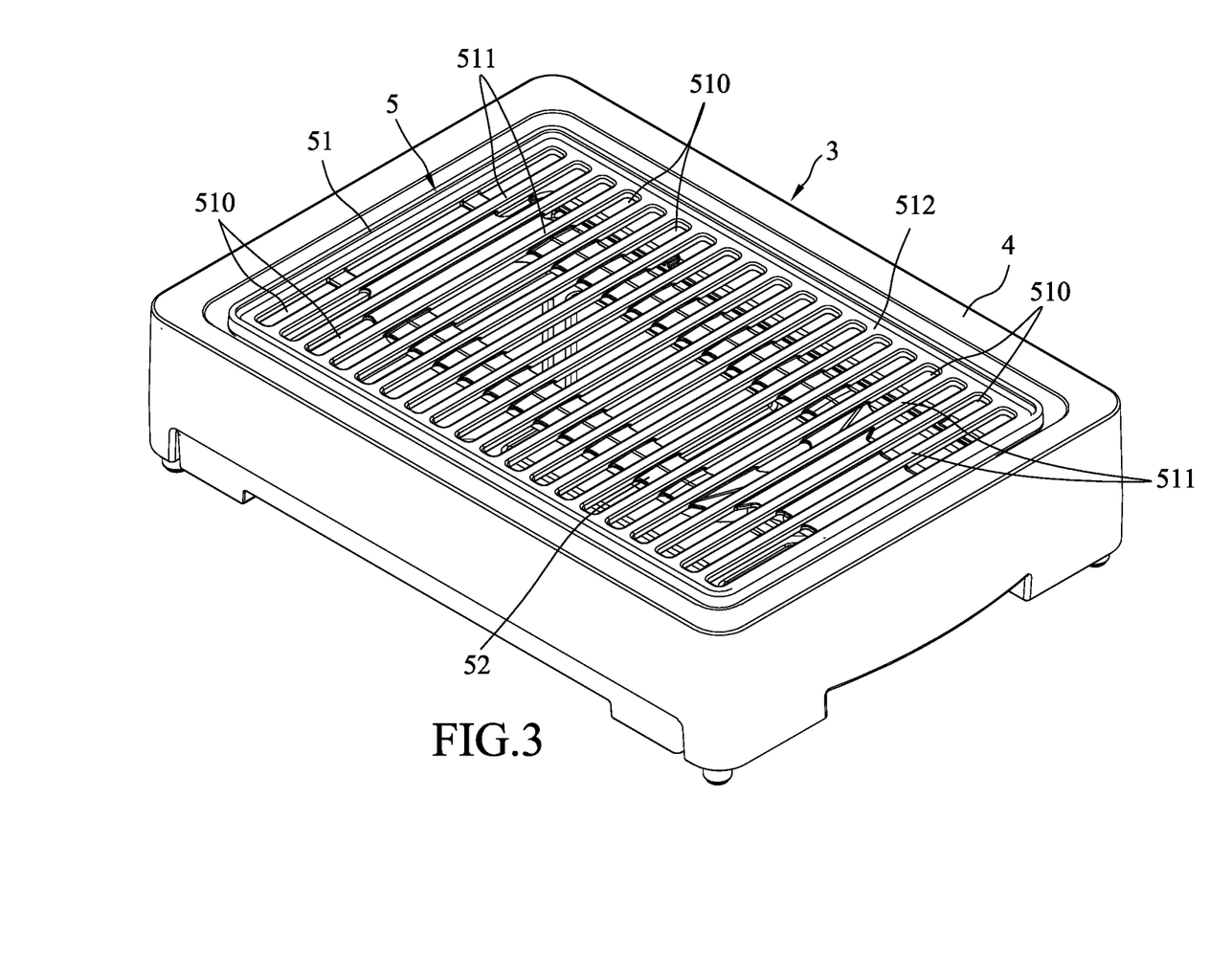
FIG. 3 is a perspective view illustrating an embodiment of a cooking device according to the disclosure.
Figure 4:
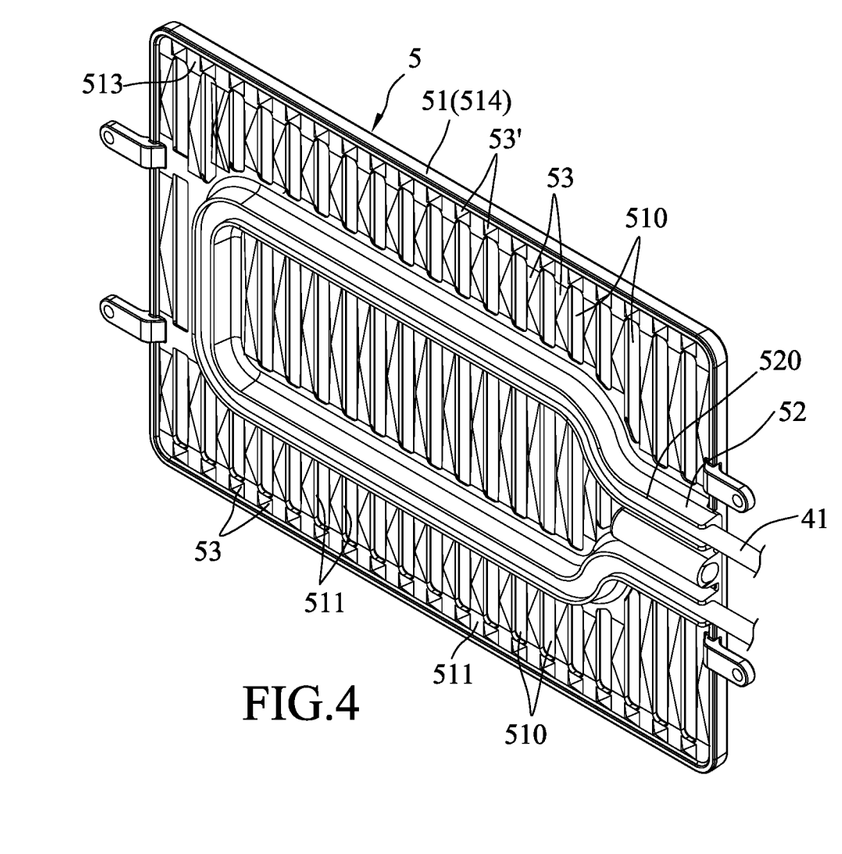
FIG. 4 is a bottom view illustrating an oil discharge roast pan of the cooking device.
Figure 5:
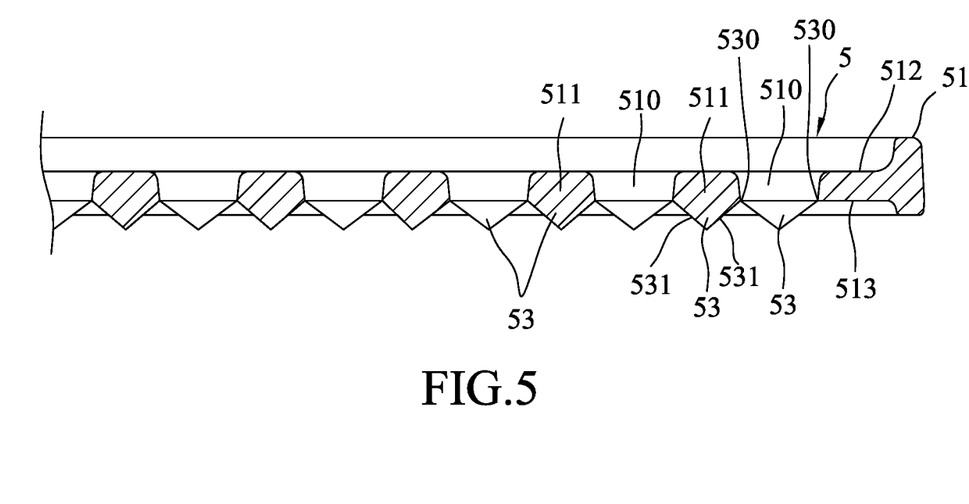
FIG. 5 is a partially cross-sectional view of FIG. 4.

FIGS. 3 to 5 show a cooking device 3 according to an embodiment of the disclosure. The cooking device 3 includes a heating unit 4 and an oil discharge roast pan 5 mounted to and heated by the heating unit 4 for cooking food.

The oil discharge roast pan 5 includes a pan body 51, a plurality of oil discharge holes 510 extending through top and bottom surfaces 512, 513 of the pan body 51, a mounting rib 52 disposed under the bottom surface 513 of the pan body 51, and a plurality of protrusions 53 protruding downwardly from the bottom surface 513 of the pan body 51.

The pan body 51 further includes a plurality of spaced-apart food support portions 511 which are spaced apart from each other to cooperatively define the oil discharge holes 510. Specifically, each of the food support portions 511 is formed between two of the oil discharge holes 510.

The mounting rib 52 is connected to the food support portions 511, and is defined with a mounting groove 520 that extends along a length direction of the mounting rib 52 and that has an opening facing downwardly. In this embodiment, the heating unit 4 includes a heating member 41 that extends along the mounting groove 520 and that is embedded in the mounting groove 520.

Each protrusion 53 is disposed under one of the food support portions 511, and has a top side edge 530 connecting or adjoining a boundary of at least one of the oil discharge holes 510. The configuration of each protrusion 53 is arranged to taper downwardly from the bottom surface 513 of the pan body 51. In this embodiment, each of the protrusions 53 has two opposite outer surfaces 531 with top ends which respectively adjoin boundaries of two of the oil discharge holes 510. The two opposite outer surfaces 531 extend downwardly in a converging manner. The protrusions 53 are arranged in multiple rows. The protrusions 53 in each row are linearly disposed under one of the food support portions 511 at intervals. In this embodiment, each protrusion 53 has a cross-section gradually decreasing downwardly from the bottom surface 513. The protrusions 53 and the food support portions 511 are integrally formed with the pan body 51.

In addition, the pan body 51 further includes a peripheral portion 514 surrounding the food support portions 511 and the oil discharge holes 510, and a plurality of spaced apart auxiliary protrusions 53' which project downwardly from the peripheral portion 514. Each auxiliary protrusion 53' has an outer surface adjoining a boundary of one of the oil discharge holes 510 and extends downwardly in an inclining manner with respect to a plane perpendicular to the peripheral portion 514. Each of the protrusions 53 and the auxiliary protrusions 53' has a pyramidal shape.

While two opposite outer surfaces 531 of each protrusion 53 respectively adjoin the boundaries of two oil discharge holes 510 in this embodiment, according to other embodiments, when more than one row of the protrusions 53 are disposed under each food support portion 511, each protrusion 53 may have one outer surface to adjoin the boundary of one oil discharge hole 510 and extend downwardly in an inclining manner with respect to a plane perpendicularly intersecting the corresponding one of the food support portions 511 at the boundary.

When food is cooked by the cooking device 3, grease drippings from the food being cooked flow through the oil discharge holes 510 to the bottom surface 513 of the pan body 51 and are then guided by the outer surfaces 531 of the protrusions 53 to flow downward. The protrusions 53 that taper downwardly can collect a large quantity of the grease drippings thereunder. The large quantity of the grease drippings are formed into droplets which can easily drop downward and escape from the high temperature oil discharge roast pan 5. The problem of producing considerable amount of smoke due to overheating can therefore be avoided.

Further, the arrangement of the protrusions 53 that taper downwardly eliminates formation of dead spaces at the bottom surface 513 of the pan body 51. Therefore, the grease drippings can easily escape from the pan body 51 and the pan body 51 can be cleaned conveniently. While the top side edge 530 of each protrusion 53 directly adjoins the boundaries of two oil discharge holes 510, the embodiment is not limited thereto. A spacing may be present between the top side edge 530 of each protrusion 53 and the boundaries of the oil discharge holes 510 as long as each protrusion 53 is able to collect and drop the grease drippings downwardly from the pan body 51.

Figure 6:
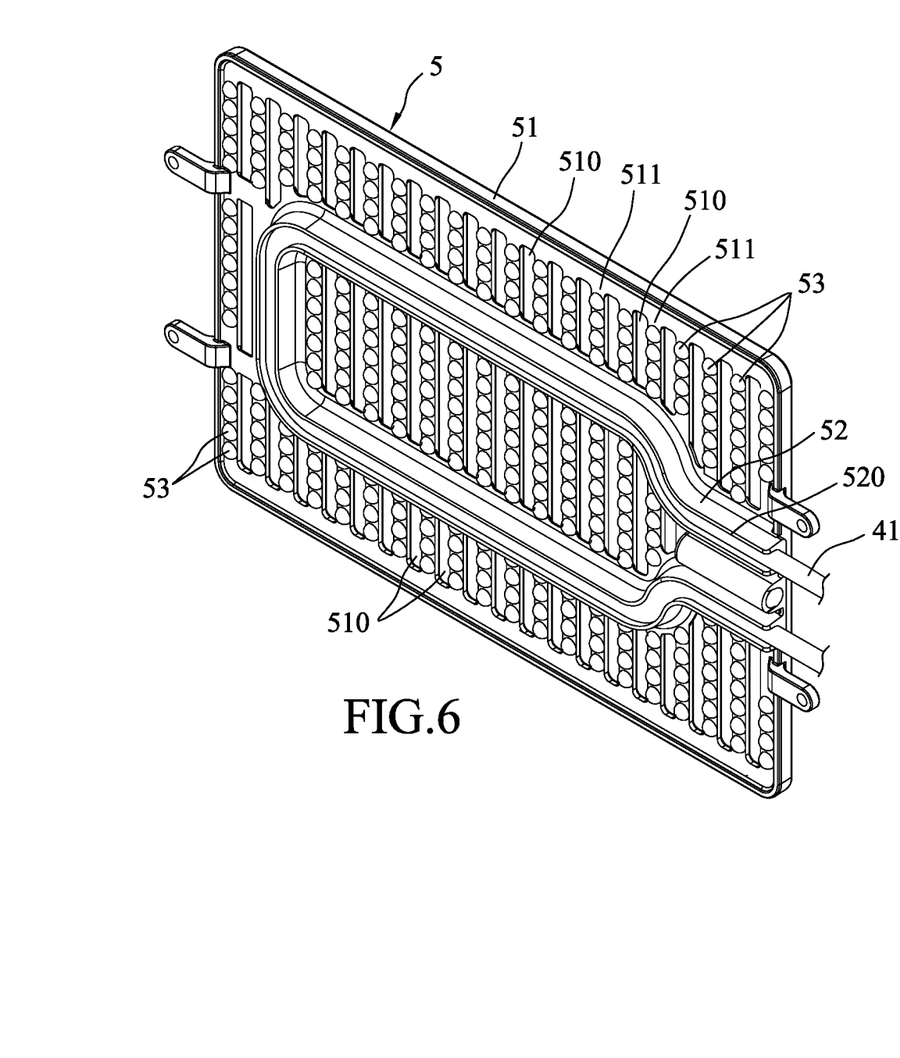
FIG. 6 is a bottom view illustrating an oil discharge roast pan in another embodiment of a cooking device according to the disclosure.
Figure 7:
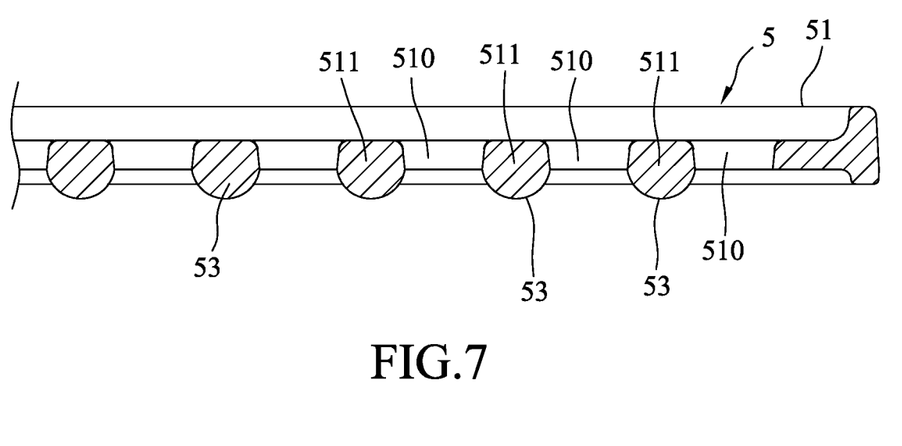
FIG. 7 is a partially cross-sectional view of FIG. 6.

FIGS. 6 and 7 show another embodiment in which each protrusion 53 has a hemispherical shape.

Figure 8:
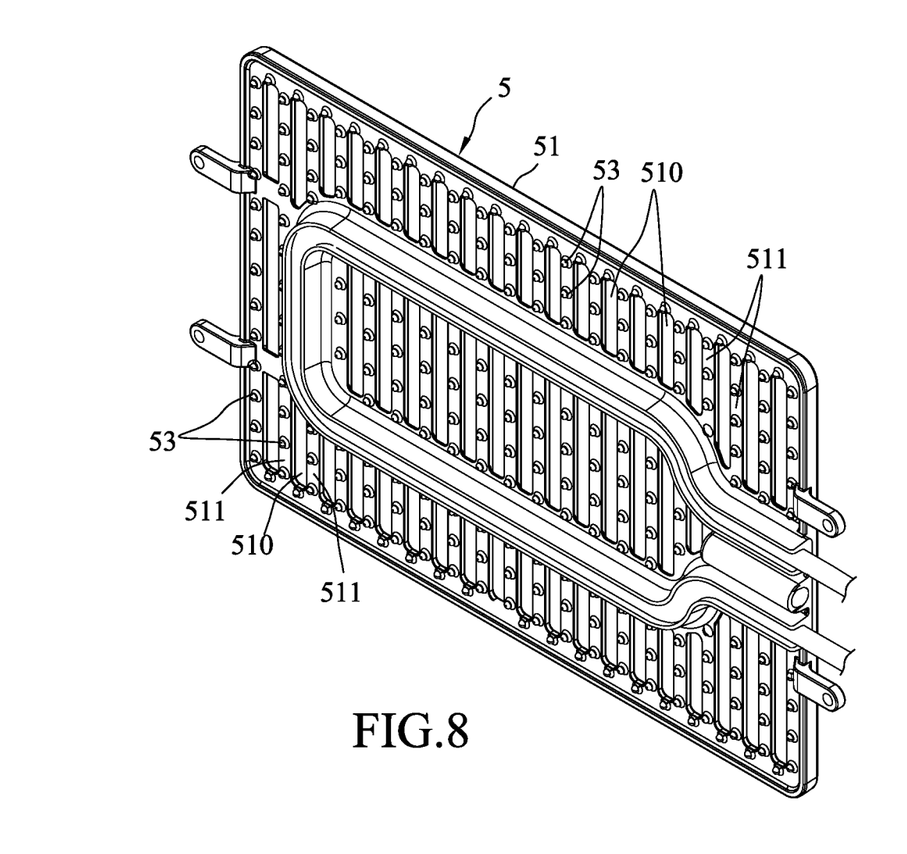
FIG. 8 is a bottom view illustrating an oil discharge roast pan in still another embodiment of a cooking device according to the disclosure.
Figure 9:
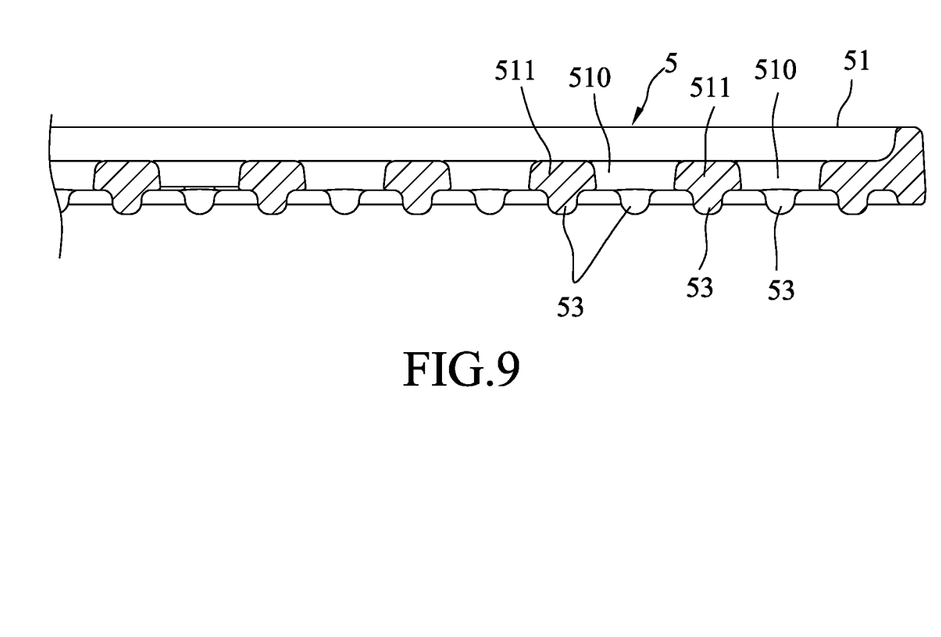
FIG. 9 is a partially cross-sectional view of FIG. 8.

FIGS. 8 and 9 show still another embodiment in which each protrusion 53 has a conical shape.

In conclusion, by virtue of the unique structural design of the protrusions 53 protruding downwardly from the bottom surface 513 of the pan body 51, during the process of roasting food, the efficient oil collecting effect produced by the protrusions 53 enables the grease flowing through the oil discharge holes 510 to accumulate rapidly and to form a large quantity of drippings that can easily fall downward and quickly escape from the oil discharge roast pan 5. The roasting smoke problem encountered in the prior art is therefore avoided. Further, because the bottom surface 513 of the pan body 51 is provided with an open-type design that can greatly reduce the amount of dead spaces capable of retaining grease, the pan body 51 can be easily cleaned and preserved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A cooking device, comprising:
    a heating unit; and
    an oil discharge roast pan mounted on the heating unit to be heated up by the heating unit, the oil discharge roast pan comprising a pan body, a plurality of oil discharge holes extending through top and bottom surfaces of the pan body, and a plurality of protrusions protruding downwardly from the bottom surface;
    wherein the pan body further comprises a plurality of food support portions which are spaced apart from each other to cooperatively define the oil discharge holes;
    wherein the protrusions are disposed under the food support portions; and
    wherein each of the protrusions tapers downwardly from the bottom surface and has a side that is adjacent to one of the oil discharge holes in an inclining manner, so that the protrusions are adapted to collect a large quantity of grease drippings flowing through the oil discharge holes.

2. The cooking device as claimed in claim 1, wherein the protrusions and the food support portions are integrally formed with the pan body.

3. The cooking device as claimed in claim 1, wherein the protrusions are arranged in multiple rows, and the protrusions in each row are linearly disposed under one of the food support portions.

4. The cooking device as claimed in claim 1, wherein:
    the oil discharge roast pan further comprises a mounting rib disposed under the bottom surface of the pan body and connected to the food support portions;
    the mounting rib is defined with a mounting groove that extends along a length direction of the mounting rib and that has an opening facing downwardly; and
    the heating unit comprises a heating member that extends along the mounting groove and that is embedded in the mounting groove.

5. The cooking device as claimed in claim 4, wherein each of the mounting rib and the mounting groove is U-shaped.

6. The cooking device as claimed in claim 1, wherein each of the protrusions has a top side edge adjoining a boundary of one of the oil discharge holes.

7. The cooking device as claimed in claim 4, wherein each of the protrusions has a hemispherical, conical, or pyramidal shape.

8. An oil discharge roast pan, comprising a pan body, a plurality of oil discharge holes extending through top and bottom surfaces of the pan body, and a plurality of protrusions protruding downwardly from the bottom surface,
    wherein the pan body further comprises a plurality of food support portions which are spaced apart from each other to cooperatively define the oil discharge holes,
    wherein the protrusions are disposed under the food support portions, and
    wherein each of the protrusions tapers downwardly from the bottom surface and has a side that is adjacent to one of the oil discharge holes in an inclining manner, so that the protrusions are adapted to collect a large quantity of grease drippings flowing through the oil discharge holes.

9. The oil discharge roast pan as claimed in claim 8, wherein the protrusions and the food support portions are integrally formed with the pan body.

10. The oil discharge roast pan as claimed in claim 8, wherein each of the protrusions has a top side edge adjoining a boundary of one of the oil discharge holes.

11. The oil discharge roast pan as claimed in claim 8, further comprising a mounting rib disposed under the bottom surface of the pan body and connected to the food support portions, wherein the mounting rib is defined with a mounting groove that extends along a length direction of the mounting rib and that has an opening facing downwardly, and the mounting groove is configured for a heating unit to be embedded therein.

12. The oil discharge roast pan as claimed in claim 8, wherein the protrusions each have a cross-section gradually decreasing downwardly from the bottom surface.

13. The oil discharge roast pan as claimed in claim 8, wherein each of the protrusions has a hemispherical, conical or pyramidal shape.

14. The oil discharge roast pan as claimed in claim 8, wherein each of the food support portions is formed between two of the oil discharge holes, and each of the protrusions has two opposite top side edges respectively adjoining the boundaries of two of the oil discharge holes.

15. The oil discharge roast pan as claimed in claim 14, wherein the protrusions are arranged in multiple rows, and the protrusions in each row are disposed linearly under one of the food support portions at intervals.

* * * * *